May 23, 1961 A. C. EVERETT 2,985,338
CLOSURE FEEDING APPARATUS
Filed April 5, 1954 2 Sheets-Sheet 1
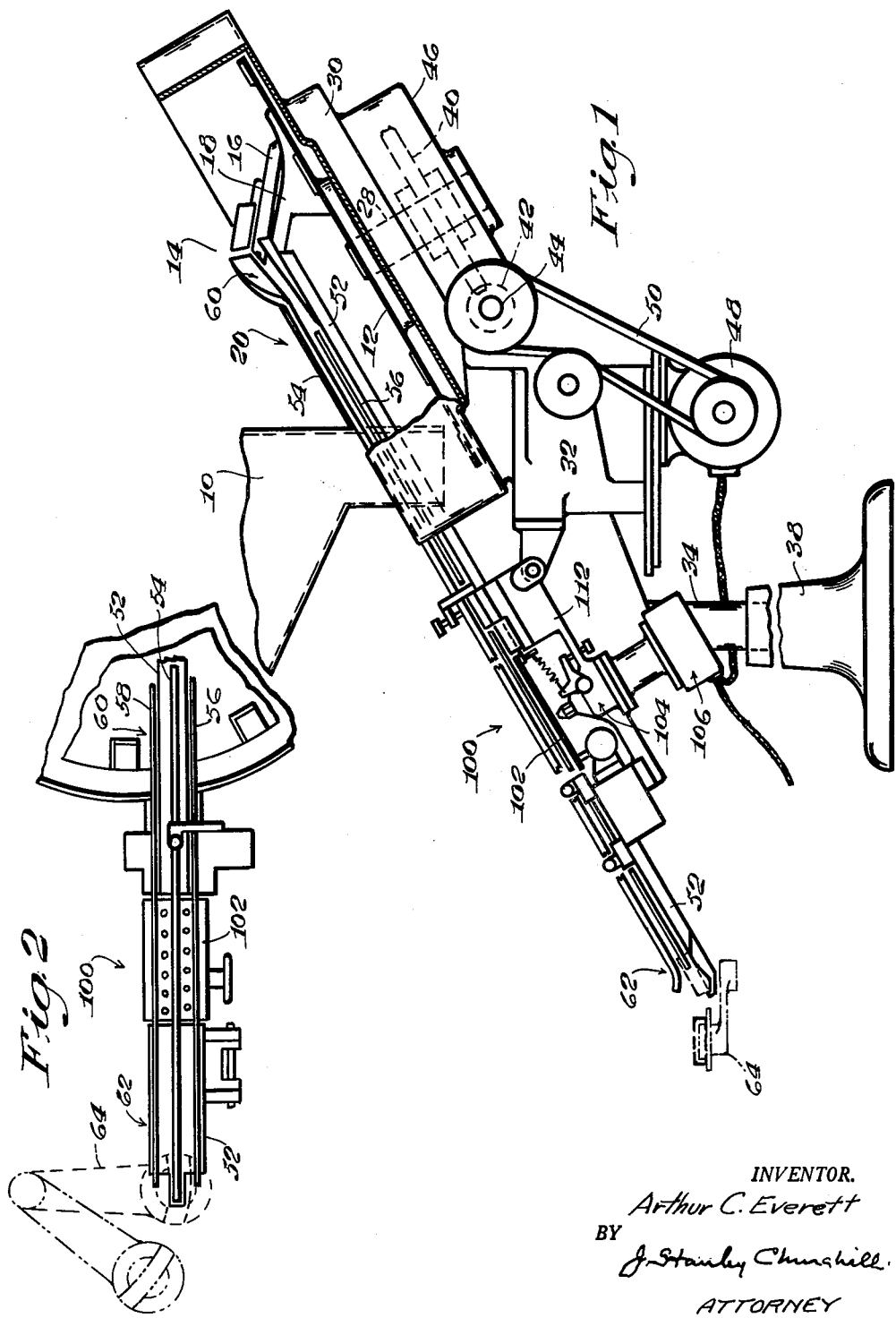
INVENTOR.
Arthur C. Everett
BY
J. Stanley Churchill.
ATTORNEY

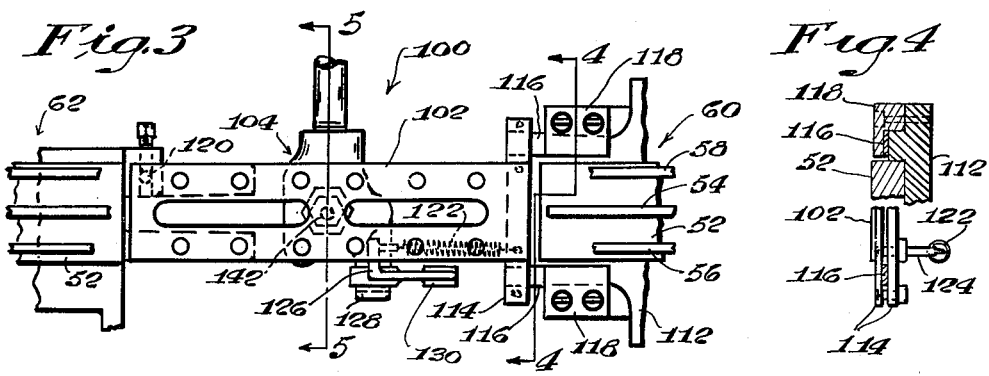

United States Patent Office 2,985,338
Patented May 23, 1961

2,985,338

CLOSURE FEEDING APPARATUS

Arthur C. Everett, Quincy, Mass., assignor to Pneumatic Scale Corporation, Limited, Quincy, Mass., a corporation of Massachusetts Filed Apr. 5, 1954, Ser. No. 420,840

5 Claims. (Cl. 221—9)

This invention relates to closure feeding apparatus.

The invention has for an object to provide novel and improved closure feeding apparatus adapted to withdraw closures, such as screw caps, from a bulk supply thereof and to deliver the closures in an oriented position into a feed chute for delivery to a closure applying machine, and which embodies novel control mechanism for terminating the operation of the feeding apparatus when the feed chute becomes filled to a predetermined point, such as occurs when the applying machine is stopped or when the closures are supplied in excess of the requirements of the applying machine to the end that unnecessary handling and agitation of the closures in the feeding apparatus are eliminated when the supply in the chute exceeds the demand.

With this general object in view and such others as may hereinafter appear the invention consists in the closure feeding apparatus and in the various structures, arrangements and combinations of parts hereinafter described and particularly defined in the claims at the end of this specification.

In the drawings illustrating the preferred embodiment of the invention:

Fig. 1 is a side elevation of the present closure feeding apparatus;

Fig. 2 is a plan view of the feed chute;

Fig. 3 is a plan view detail of a portion of the feed chute shown in Fig. 2 illustrating the control mechanism;

Fig. 4 is a detail view, partly in cross section, as seen from the line 4—4 of Fig. 3;

Fig. 5 is a cross-sectional detail of a portion of the control mechanism taken on the line 5—5 of Fig. 3; and Fig. 6 is a side elevation, partly in cross section, of the control mechanism shown in Fig. 3.

In general the present invention contemplates novel closure feeding apparatus for use in connection with a closure applying machine wherein it is desired to deliver the closures, such as screw caps, in a line and oriented to face in the same direction. In general in the operation of the machine the closures are withdrawn from a bulk supply thereof and guided through orienting mechanism, and the oriented closures are advanced and delivered into the upper end of a feed chute for delivery to the closure applying machine. The closures are successively withdrawn from the lower end of the chute by transfer means forming a part of the closure applying machine to be transferred into operative relation to closure applying mechanism. In the operation of such feeding apparatus the closures in the bulk supply are continuously jostled and changed in position by contact with adjacent closures as they are advanced to cause them to assume a predetermined position to be guided into the orienting mechanism. Those closures which enter the orienting mechanism in other than a predetermined position are rejected to fall back into the bulk supply.

In accordance with the present invention provision is made for terminating the operation of the closure feeding and orienting mechanism when the supply of closures accumulated in the feed chute exceeds the demand of the closure applying machine whereby to avoid unnecessary jostling and agitation of the closures in the feeding apparatus and to reduce to a minimum the liability of marring the closures by contact with adjacent closures in the feeding apparatus. In the illustrated embodiment of the invention control mechanism is provided for terminating the operation of the feeding apparatus when the feed chute becomes filled to a predetermined point, such as occurs when the applying machine is stopped or when the oriented closures are supplied in excess of the requirements of the applying machine, such control also being arranged to initiate the operation of the closure feeding apparatus to continue the feed of closures when the applying machine is again started to withdraw successive closures from the lower end of the feed chute.

Referring now to the drawings, the present invention is illustrated as embodied in a closure feeding apparatus of the type wherein a bulk supply of closures may be stored in a hopper 10 to be delivered to rotary inclined carrier, indicated generally at 12, which is adapted to advance the closures deposited at the lower end thereof from the hopper and to carry the closures upwardly into engagement with guide means, indicated generally at 14. Successive closures arriving at the upper end of the inclined carrier are guided into engagement with the beveled marginal edge of a rotary orienting disk 16 arranged in a substantially horizontal plane and preferably in a plane slightly inclined downwardly with respect to the plane of the carrier disk 12. As the closures are advanced along the edge of the orienting disk 16 they leave the carrier 12 and are supported between the beveled edge of the orienting disk 16 and a cooperating stationary closure supporting rail 18. In operation those closures assuming a desired predetermined position between the orienting disk 16 and the rail 18 are capable of maintaining their stability and are advanced into the upper end of a delivery or feed chute 20 for delivery to the closure applying or other machine. Those closures assuming other than the desired position are incapable of maintaining their stability between the disk 16 and rail 18 and are permitted to fall back onto the carrier 12 to be returned to the main group of closures at the lower end of the carrier 12 to be again advanced into engagement with the orienting mechanism.

As indicated generally herein, the rotary carrier 12 may be secured to the upper end of a shaft 28 and is mounted to rotate in a circular supporting bracket 30 attached to a supporting bracket 32, the latter being secured to a column 34 adjustably supported in a base member 38. The carrier shaft 28 is provided with a worm wheel 40 fast thereon arranged to mesh with a worm gear 42 fast on a shaft 44 journalled in a gear box 46 secured to the underside of the circular bracket 30. The shaft 44 is arranged to be rotated by an electric motor 48 connected to the shaft by a belt and pulley drive 50. The orienting disk 16 may be rotated by frictional engagement with the carrier 12.

The feed chute 20 may include a bottom rail 52, a top rail 54 and side rails 56, 58 adjustably supported to accommodate different sizes of closures, the receiving end 60 of the chute being positioned relative to the orienting disk 16 so as to engage an oriented closure carried along the edge of the disk and to guide the closure into the chute. The discharge end 62 of the chute may extend into operative relation to a transfer arm 64, indicated in dotted lines, which forms a part of the closure applying machine and which is adapted to withdraw successive endmost closures from the discharge end of the chute and to transfer the same to closure applying mechanism, as illustrated and described in the United States Patent to Everett, No. 2,082,048.

In accordance with the present invention control mechanism, indicated generally at 100, is provided intermediate the receiving and discharging sections of the chute and which is arranged to discontinue the operation of the closure feeding and orienting apparatus when the feed chute becomes filled to a predetermined point. In general the control mechanism includes a flexibly mounted bridge plate 102 extended between the discontinued portions of the bottom rail 52 of the receiving and discharge sections 60, 62. The bridge plate 102 is arranged to cooperate with a pneumatically operated control unit, indicated generally at 104, which is operatively connected to a switch 106 forming a part of the circuit to the driving motor 48. In operation successive individual closures delivered to the receiving end of the chute may slide down the chute and across the bridge plate to be retained at the discharge end of the chute until removed therefrom by the transfer arm 64. When the feed chute becomes filled to a point where a plurality of closures accumulate and come to rest on the bridge plate 102, the weight of the closures causes the plate to be depressed, the depression of the plate being arranged to increase the air pressure in the pneumatically operated unit 104 which in turn effects opening of the normally closed contacts 108, 110 of the switch 106 to discontinue operation of the closure feeding apparatus. Subsequently, when a sufficient number of closures have been withdrawn from the discharge end of the chute to permit the closures to slide off the flexibly mounted bridge plate, the air pressure in the pneumatically operated unit 104 is reduced, and the switch contacts are permitted to close to start operation of the closure feeding apparatus. As herein shown, the ends of the receiving and discharging sections 60, 62 adjacent the control mechanism are supported in a bracket 112 attached to the supporting bracket 32.

Referring now to Figs. 3 and 6, the bridge plate 102 may comprise a relatively thin metal plate supported at one end on the upper one of two cross bars 114 which in turn is supported by a pair of flat leaf springs 116 forming flexible hinges which are clamped at one end between the upper and lower cross bars 114 and are secured at their other ends to the end of the bottom rail 52 by clamp members 118. The other end of the bridge plate is free to move downwardly under the influence of the weight of a plurality of closures resting thereon, being limited in its downward movement by a stop pin 120 adjustably mounted in the bracket 112. As herein shown, the bridge plate 102 is arranged to be urged to rock upwardly on its spring hinges 116 to counterbalance the weight of an individual closure passing thereover by a coil spring 122 connected between a spring stud 124 depending from the cross bars 114, and one arm 126 of a bell crank pivotally mounted at 128. The other arm 130 of the bell crank is engaged by a stop screw 132 adjustably mounted in the bracket 112. Thus, in practice the effective tension of the counterbalancing spring 122 may be adjusted for different weights of closures so as to permit an individual closure to slide across the resiliently mounted bridge plate 102 without effecting flexing of the hinges and to cause the plate to be rocked downwardly on its hinges 116 when a plurality of closures comes to rest on the bridge plate. As shown in Fig. 5, the plate 102 may be limited in its upward rocking movement by a hooked stop member 134 adjustably secured to the stop pin 120. The extension of the leaf springs 116 may also be adjusted slightly by loosening the clamp members 118 to vary the flexibility of the spring hinges. In practice the free end of the bridge plate may be substantially flush with the bottom rail 52 of the discharge section 62 when the plate is in its downwardly rocked position to permit the closures to slide off the bridge plate and into the discharge end of the chute when closures are withdrawn from the chute. When the bridge plate is rocked upwardly, individual closures may slide off the elevated end of the plate and down onto the bottom rail 52 to continue down the chute.

As above described, depression of the bridge plate 102 is arranged to effect an increase in air pressure in the pneumatically operated unit 104 which in turn is arranged to open the switch contacts 108, 110 to discontinue operation of the apparatus. As herein shown, the pneumatically operated unit is provided with an air chamber 136 having an inlet 138 which may be connected to a regulated source of air under pressure, the inlet having a restricted throat portion 140. The outlet from the chamber comprises a nozzle or jet member 142 having a relatively small discharge orifice 144. The bridge plate 102 is arranged to cooperate with the jet member 142 to control the escape of air from the orifice, the plate being normally spaced a short distance from the discharge orifice, and when the plate is moved a relatively short distance downwardly toward the discharge orifice, a relatively large pressure change occurs in the chamber 136. As illustrated in Fig. 6, a spring-pressed piston 146 is slidingly mounted in the chamber 136, the piston having a stem portion 148 extended through a guide opening in a hollow bracket 150 having flange portions at both ends, the upper flange being connected to the underside of the bracket 112 and the lower flange supporting the casing of the switch 106. A spring 152 coiled about the stem 148 is interposed between the underside of the piston head 146 and a counterbored portion of the bracket 150 and tends to urge the piston upwardly in the chamber 136 against the pressure of the air, and upon an increase in the air pressure in the chamber the piston is moved downwardly.

The switch 106 may comprise any usual or preferred form of commercially available switch, the one illustrated comprising an enclosed explosion-proof switch having an upwardly spring-pressed operating pin 154 provided with an extended head portion 156. In operation when the piston 146 is moved downwardly by an increase in the air pressure in the chamber 136 the stem 148 engages the head 156 of the operating pin 154 to effect separation of the normally closed contacts 108, 110. As shown in Fig. 6, the operating pin 154 may extend through an opening in the blade of the upper contact 108 of the normally closed contacts and engage the blade of the lower contact 110 to effect separation of the contacts, as described.

From the above description it will be observed that the present closure feeding apparatus embodies novel control mechanism adapted to effect termination of operation of the apparatus when the supply of oriented closures being introduced into the feed chute exceeds the rate of withdrawal from the discharge end thereof to the end that unnecessary jostling and agitation of the closures in the orienting mechanism are eliminated. The different positions of the flexibly mounted bridge plate 102, indicated in full and dotted lines in Fig. 6, have been exaggerated to some extent, it being understood that in practice the movement of the bridge plate may actually comprise only a few thousandths of an inch relative to the small discharge orifice 144 to effect a relatively large increase in the pressure in the chamber 136 and operation of the switch 106. Also, in practice the counterbalancing spring 122 may and preferably will be adjusted so that depression of the plate to the dotted line position will be effected when two or more closures come to rest thereon, preferably when a number of closures sufficient to extend midway between the ends of the plate have come to rest thereon. Thereafter when the closures are subsequently withdrawn from the end of the chute and slide off the bridge plate the latter will return to its full line position, thus reducing the pressure in the chamber 136 and permitting closing of the switch 106 to start operation of the feeding apparatus.

While the present feeding apparatus has been illustrated and described as embodying a particular form of commercially available selecting and orienting mechanism, it will be understood that the invention may be embodied in other forms of feeding apparatus, and while the preferred embodiment of the invention has been herein illustrated and described, it will be understood that the invention may be embodied in other forms within the scope of the following claims.

Having thus described the invention, what is claimed is:

1. In apparatus of the character described, in combination, an inclined gravity feed closure feeding chute from which successive closures may be withdrawn, means for delivering closures into the receiving end of the chute, and control means actuated by the weight of a relatively few accumulated closures coming to rest in a predetermined portion of the chute for terminating operation of said closure delivery means and for again initiating operation of the delivery means when the relatively few accumulated closures are withdrawn beyond said predetermined portion, said control means including a bridge plate having a flexible mounting and disposed intermediate the ends of said chute and arranged to be depressed a minute distance by the weight of a relatively few closures coming to rest on said plate, and means actuated by said relatively minute depression of the plate for controlling the operation of said delivery means, said flexible mounting including a pair of flat leaf springs connected between one end of the plate and a portion of said chute.

2. In apparatus of the character described, in combination, an inclined gravity feed closure feeding chute from which successive closures may be withdrawn, means for delivering closures into the receiving end of the chute, and control means actuated by the weight of a relatively few accumulated closures coming to rest in a predetermined portion of the chute for terminating operation of said closure delivery means and for again initiating operation of the delivery means when the relatively few accumulated closures are withdrawn beyond said predetermined portion, said control means including a flexibly mounted bridge member disposed intermediate the ends of said chute over which single closures may slide and arranged to be depressed a minute distance by the weight of a relatively few closures coming to rest on said plate, and a pneumatically operated unit cooperating with said plate for controlling the operation of said delivery means, said pneumatically operated unit having a pressure chamber and an air escape orifice spaced a relatively short distance from the underside of said bridge plate, minute downward movement of said bridge plate toward said orifice effecting a substantial pressure increase in said pressure chamber to control the operation of the delivery means.

3. In apparatus of the character described, in combination, an inclined gravity feed closure feeding chute from which successive closures may be withdrawn, means for delivering closures into the receiving end of the chute, and control means actuated by the weight of a relatively few accumulated closures coming to rest in a predetermined portion of the chute for terminating operation of said closure delivery means and for again initiating operation of the delivery means when the relatively few accumulated closures are withdrawn beyond said predetermined portion, said control means including a bridge plate having a flexible mounting and disposed intermediate the ends of said chute and arranged to be depressed by the weight of a relatively few closures coming to rest on said plate, means actuated by a relatively minute depression of the plate for controlling the operation of said delivery means, said flexible mounting including a pair of flat leaf springs connected between one end of the plate and a portion of said chute, the other end being free, and means including a coil spring for adjustably counterbalancing the hinged plate whereby to permit successive individual closures to slide across the plate without effecting depression thereof and to cause depression of the plate by the weight of a relatively few closures accumulated thereon.

4. In apparatus of the character described, in combination, an inclined gravity feed closure feeding chute from which successive closures may be withdrawn, means for orienting closures delivered from a bulk supply thereof and for delivering successive oriented closures into the receiving end of the chute, means for driving said orienting means including an electric motor and a switch in the motor circuit, control means including a bridge plate disposed intermediate the ends of said chute, said bridge plate being flexibly hinged at one end, the other end being free to be depressed by the weight of a relatively few closures coming to rest thereon, a pneumatically operated unit cooperatng with said plate, said pneumatically operated unit comprising a pressure chamber and an air escape orifice spaced a relatively short distance from the underside of said bridge plate, depression of said plate through a relatively minute distance effecting an increase in pneumatic pressure in said unit, said unit having an operating rod actuated by said increase in pressure and arranged to cooperate with said switch to effect opening of the motor circiut to discontinue operation of the orienting means, said unit permitting return of the switch to closed position when the accumulated closures are cleared from said bridge plate.

5. In apparatus of the character described, in combination, an inclined gravity feed closure feeding chute from which successive oriented closures may be withdrawn, means for orienting closures delivered from a bulk supply thereof and for delivering successive oriented closures into the receiving end of the chute, and control means including a flexibly hinged depressible bridge plate over which successive single closures may slide, said bridge plate being actuated by the weight of a relatively few accumulated closures coming to rest on said bridge plate in a predetermined portion of the chute, and means responsive to relatively minute depression of said bridge plate for terminating operation of the apparatus and for again initiating operation of the apparatus when the accumulated closures are withdrawn from the chute beyond said predetermined portion, said responsive means comprising a pressure responsive pneumatically operated unit having a pressure chamber and an air escape orifice spaced a relatively short distance from the underside of said bridge plate, minute downward movement of said bridge plate toward said orifice when actuated by the weight of a relatively few closures at said predetermined portion effecting a substantial pressure increase in said pressure chamber to effect said termination of operation.

References Cited in the file of this patent

UNITED STATES PATENTS

| | | |
|---|---|---|
| 1,336,785 | Matter et al. | Apr. 13, 1920 |
| 1,355,488 | McKenney | Oct. 12, 1920 |
| 1,499,224 | Klein | June 24, 1924 |
| 1,769,910 | Ponsonby et al. | July 1, 1930 |
| 2,252,498 | Flaws | Aug. 12, 1941 |
| 2,266,906 | Rapp | Dec. 23, 1941 |
| 2,530,698 | Hogeberg | Nov. 21, 1950 |
| 2,553,719 | Palmer | May 22, 1951 |

FOREIGN PATENTS

| | | |
|---|---|---|
| 6,127 | Great Britain | of 1895 |
| 583,753 | Great Britain | Dec. 30, 1946 |